United States Patent [19]

Ball et al.

[11] Patent Number: 5,068,965
[45] Date of Patent: Dec. 3, 1991

[54] METHOD OF MAKING A LOW FLOW TILTING PAD THRUST BEARING

[75] Inventors: James H. Ball, New Berlin; Willis W. Gardner, Waukesha, both of Wis.

[73] Assignee: Delaware Capital Formation, Inc., Waukesha, Wis.

[21] Appl. No.: 580,814

[22] Filed: Sep. 11, 1990

Related U.S. Application Data

[62] Division of Ser. No. 412,503, Sep. 26, 1989, Pat. No. 5,007,745.

[51] Int. Cl.[5] .................. B21D 53/10; F16C 17/06
[52] U.S. Cl. ........................... 29/898.041; 29/898.07
[58] Field of Search .................. 29/898.04, 898.041, 29/898.07; 384/303, 305–308

[56] References Cited

U.S. PATENT DOCUMENTS

| 1,192,750 | 1/1891 | Caldwell | 29/898.041 X |
| 1,380,622 | 6/1921 | Winn | 29/898.041 X |
| 1,465,988 | 8/1923 | Kingsbury | 29/898.041 |
| 4,315,359 | 2/1982 | Gray | 29/898.041 X |

OTHER PUBLICATIONS

Chironis, "How to Design bearings for Hydrostatic Lubrication", Product Engineering, Jul. 1963, pp. 80–86.

Primary Examiner—Joseph M. Gorski
Assistant Examiner—Peter Dungba Vo
Attorney, Agent, or Firm—Fuller, Ryan & Hohenfeldt

[57] ABSTRACT

The bearing pads of a hydrodynamic tilting pad thrust bearing are cut from a ring and arranged in a circle within a retainer for bearing the load of a collar fastened to a rotating shaft. The leading and trailing edges of respective adjacent pads contain open edge grooves which together form a pocket for receiving and dispensing lubricating and cooling oil under controlled conditions. Semicircular grooves in the edges of the adjacent pads together form generally circular ducts through which the oil is conducted to the pockets.

3 Claims, 6 Drawing Sheets

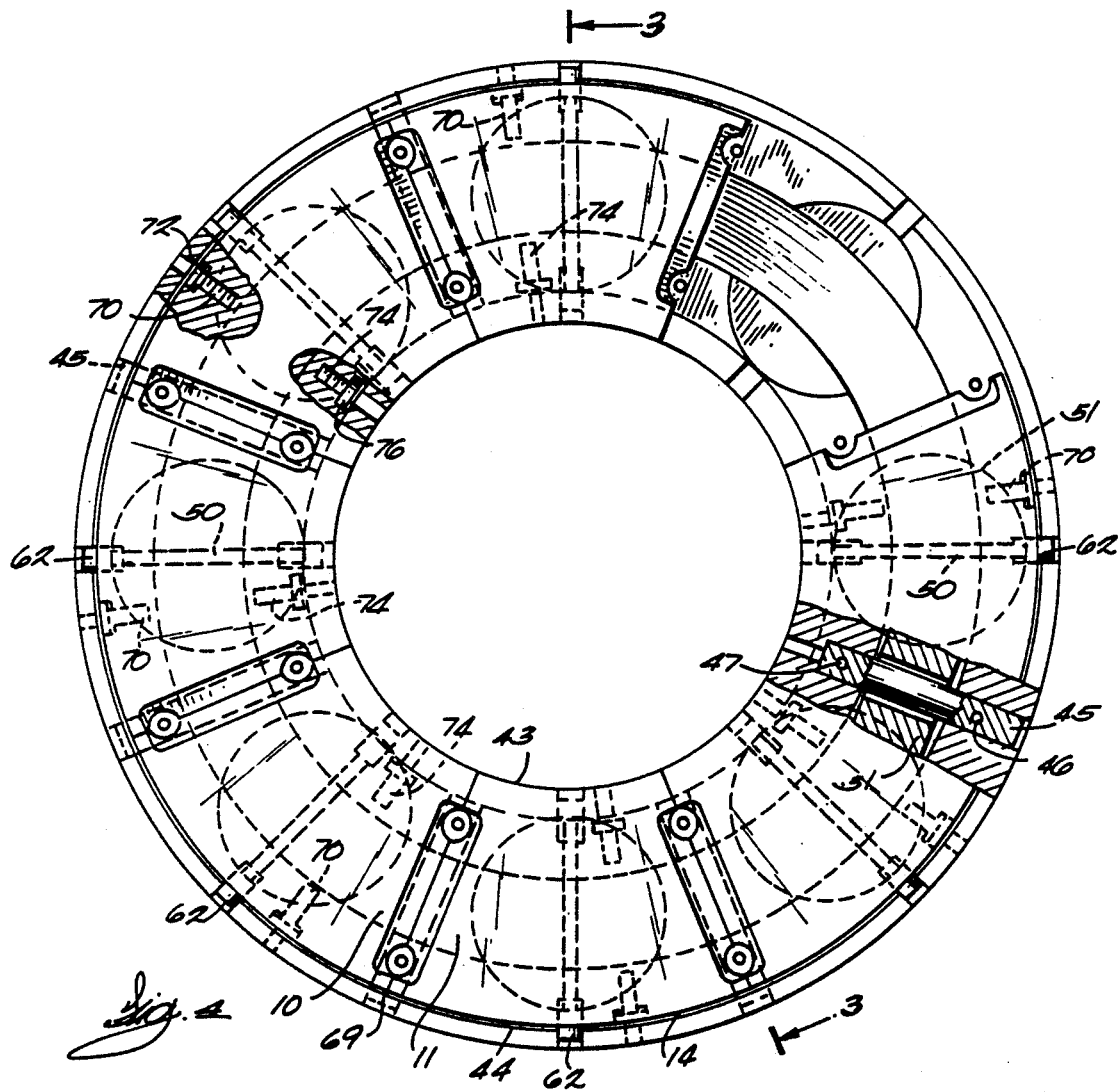

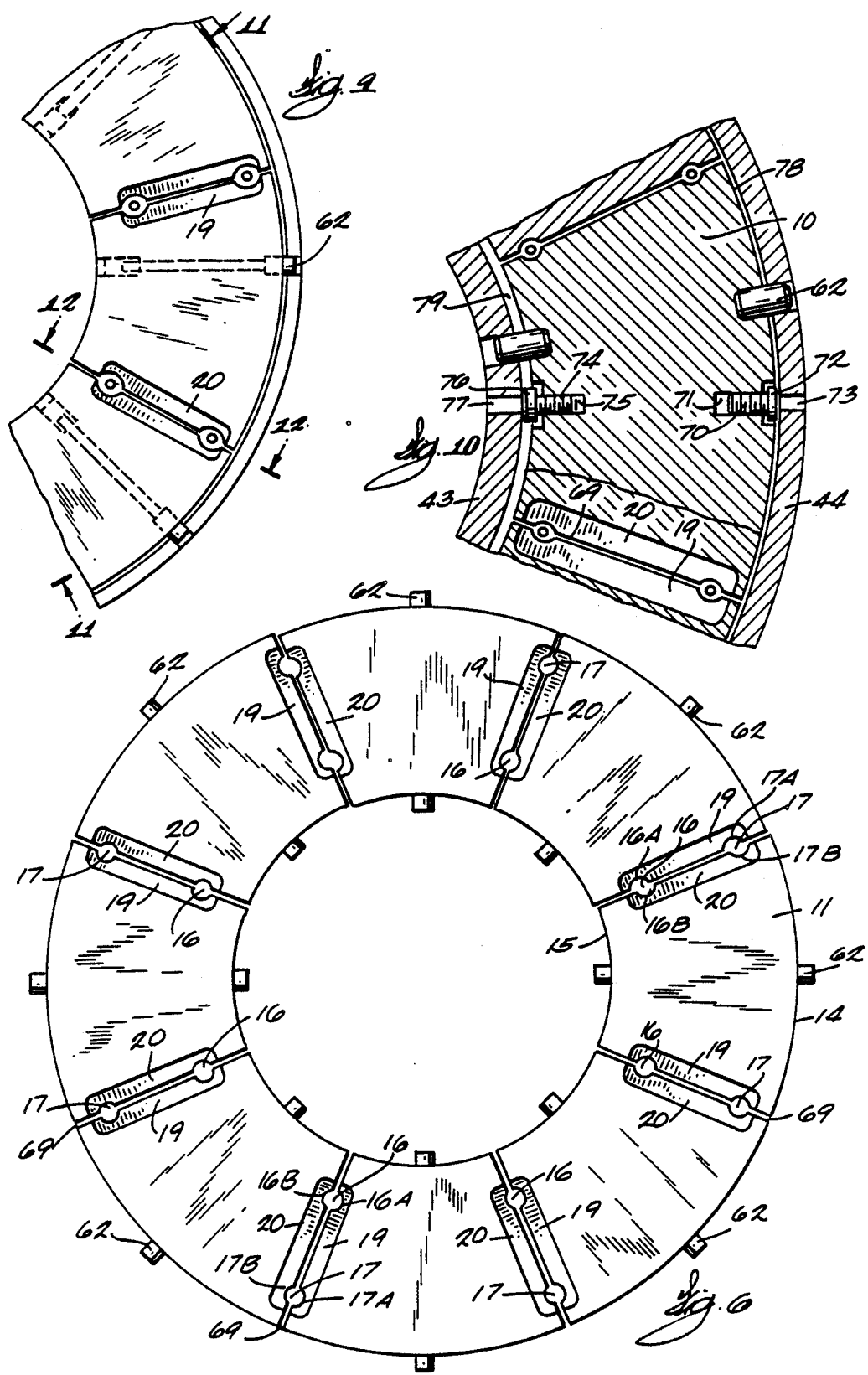

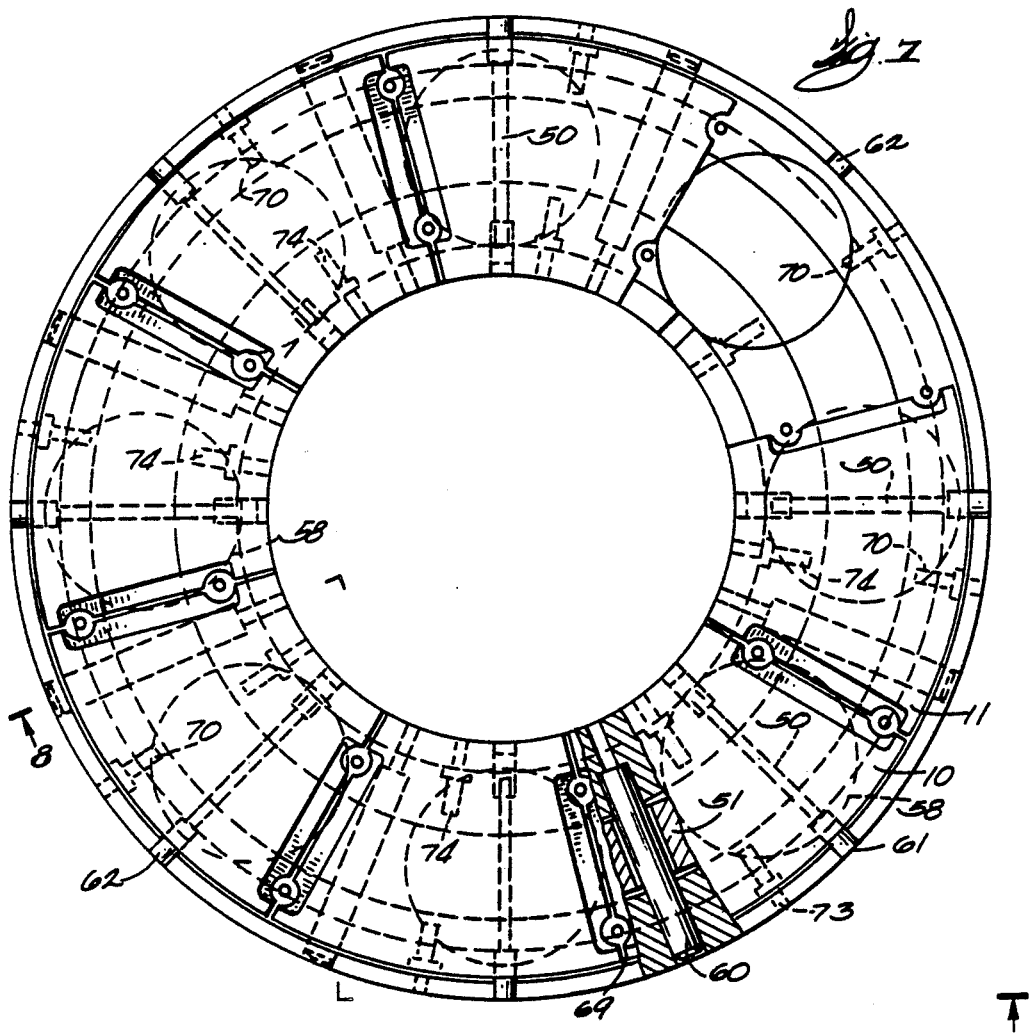
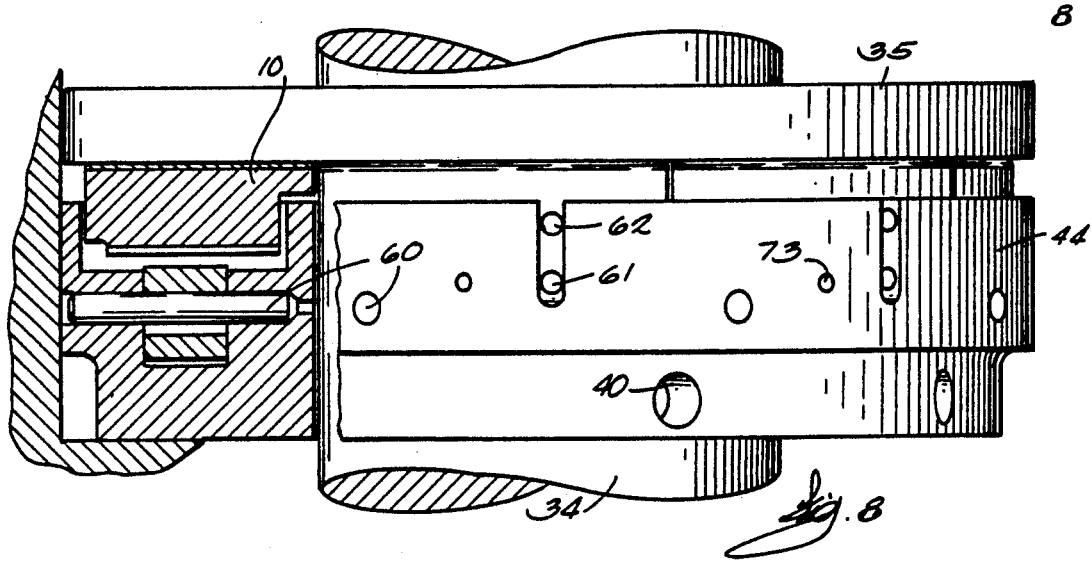

METHOD OF MAKING A LOW FLOW TILTING PAD THRUST BEARING

This is a divisional of copending application(s) U.S. Ser. No. 07/412,503 filed on Sep. 26, 1989 now U.S. Pat. No. 5,007,745.

BACKGROUND OF THE INVENTION

The disclosure herein relates to thrust bearing assemblies that typically comprise a retainer ring encompassing a plurality of thrust bearing pads arranged in circumferential spaced relationship around a shaft axis. A shaft that is to be axially supported for rotation usually has a radially extending collar providing a bearing surface that interfaces with the circular array of thrust pads which are bathed in a fluid, such as oil, which lubricates and cools the bearings. The thrust pads are customarily supported on a circular array of overlapping pivotal upper and lower leveling links that transmit forces between each other to equalize the load on the thrust pads. The pads are free to tilt to a limited extent so as to develop a wedge-shaped film of lubricant that supports the load. To equalize the load among the pads, the leveling links lower the overloaded thrust pad and raise the underloaded thrust pads. Since the leveling links are in contact, any unbalanced forces are transmitted through the leveling links until equilibrium is reached. The retainer or base through which the load on the shaft is transmitted to ground or the machine frame is in the form of an annular channel having a closed bottom and an open top and in which the leveling links and tilting bearing pads reside.

Whether the shaft is turning about a horizontal axis or a vertical axis, a thrust bearing assembly is encased in a housing through which the oil is forced at relatively low pressure for cooling and lubricating the bearings. Flat bronze floating ring seals are installed on the shaft on each side of the bearing assembly. These ring seals act as a barrier against flow or leakage of cooling oil along the longitudinal surface of the shaft. There is a small clearance between the shaft and the inside of the ring so the shaft can rotate without dragging the seal around with it. A design that permits getting rid of these floating ring seals would be desirable because, they not only add to manufacturing costs, but they do produce some non-useful energy dissipation because of the shear forces that are developed in the lubricant between rotating and stationary parts.

Conventional hydrodynamic thrust bearings used in high speed machinery require circulating, a large quantity of lubricating oil through the bearing housing at low pressure. The practical effect is that high capacity circulating pumps are necessary which increases system costs. In addition, if lubricating oil flow rate can be reduced, the size of other elements in the cooling system can be reduced such as the oil sump, heat exchangers, valves, filters and other fittings.

The thrust pads whose leading edges must tilt away from the load transmitting collar on the shaft in order to form a wedge of lubricating oil between the collar and pads are usually cut from a solid ring of bearing material. More specifically, the ring comprises a steel annulus on one surface of which there is a coating of babbitt or other low friction material. The annulus or ring is then milled or sawed along radial lines to divide it into a number of sectors or generally pie-shaped segments. In conventional tilting pad bearing assemblies which use high flow lubricating and cooling systems, a substantial amount of space is allowed between the leading edge of one pad and the trailing edge of the next preceding pad all the way around the circular array of pads in the retainer. The leading and trailing edges of the pads are machined to fairly high accuracy after they are sawed since they must fit in the annular channel of the retainer with enough clearance on their radially inward and outward ends to permit a slight amount of tilting during operation without jamming up against the walls of the retainer. No provision is made in conventional bearings for radial inward or outward adjustment of the bearing pads. The gaps between pads defined by the trailing edge of one pad and the leading edge of the adjacent pad must be rather large because these gaps are major passageways for the lubricating and cooling fluid flow. Under these conditions, there is no way to control the amount of leakage flow at the gap between pads for bearings with low surface frictional drag properties. This can be disadvantageous because it prevents conventional bearings from performing properly at low oil flow.

Expired U.S. Pat. No. 2,507,021 to Lakey appears on first impression to have a feature which might possibly solve some of the problems in conventional bearings which are discussed above The feature of interest is a radially extending groove or channel which is formed in the load bearing face of the pads, particularly inwardly from and in parallelism with the leading edge of the pads. The groove, of course, is open at its top and has closed ends. A tube feeds oil into the bottom of the groove so it fills the groove with oil. The reason for supplying oil to the pads in the region of the groove is to compensate for the amount of oil that is centrifuged radially outwardly of the pad surfaces by rotation of the interfacing load transmitting surface on the collar. The oil is fed through a duct under each pad which duct is connected to the input port or bottom hole in the groove by means of a connecting tube which has spherical outside ends so that the pads can tilt without being blocked by the tube. Because the radially extending groove is set inwardly from a radially extending leading edge of the pad there is no provision for controlling the amount of fluid that flows into the gap between pads as is the case with the invention described herein.

SUMMARY OF THE INVENTION

The bearing assembly which incorporates the invention has several of the features of a conventional bearing which were mentioned in the first paragraph in the background of the invention. The retainer means is basically the same as prior art retainer means in that it is comprised to two concentric wall members which are radially spaced from each other and have a bottom or enclosure member extending across corresponding edges of the walls to define an open annular channel In a described embodiment, there is an array of upper and lower leveling links disposed about the channel with the thrust pads pivoting on the upper leveling links as in U S. Pat. No 4,403,873 to Gardner or with the bearing pads being supported on a cylindrical member which has a spherical protrusion on its bottom surface that rests on the bottom of the retainer for allowing the pads to tilt and form the hydrodynamic oil wedge. In accordance with the invention, the leading and trailing edges of each of the bearing pads have radially extending grooves in them which are closed at their ends but are open on what are nominally their tops on which the load transmitting collar bears and on their sides which face the corresponding groove on the next ensuing bearing pad in the circular array of bearing pads constituting a bearing assembly. The open sided grooves, which might be looked upon as one-half of a groove on each trailing and leading edge are brought together with a small gap between them to form a groove or pocket which leaves a small leakage gap between the trailing and leading edges of adjacent pads. One or two axially extending grooves which are semicircular in cross section are also formed in the leading and trailing edges of the pads such that when the pads are arranged adjacent each other the semicircular grooves form what are essentially circular ducts which provide for feeding oil into the bottom of each pocket. There are webs spanning across the interior of the annular channel in the retainer means. Radial bores are made in these webs and there are capillary holes or tubes which are transverse to the bores so that low pressure oil which is fed along the outside of the retainer means flows into the bores and through the capillary holes from which, under the influence of kinetic energy inherent in the oil, results in the oil being directed upwardly into the previously mentioned ducts and from there into the pockets.

The bearing lubrication means according to the invention permits shaft and, hence, shaft collar rotation in either direction without loss of lubricating and cooling efficiency whereas the design in Lakey U.S. Pat. No. 2,507,021 is dedicated to unidirectional rotation. The new design avoids the use of the swivel tube which is used in the patent to direct oil to the bearing. Moreover, the new design has more effective load areas compared to the patent since the pad surface forward of the pocket is ineffective and so is the space between pads.

In accordance with the invention, provision is made for adjusting the bearing pads radially inwardly and outwardly inside of the annular channel in the retainer means to reduce the gap between pads which reduces the oil flow needed to feed the pad. The gap adjustment reduces the leakage between pads.

A new method of developing the pads is provided for accommodating radial adjustment of the pads just mentioned. Prior practice has been to make a ring having the radial width and thickness of the pads and appropriate inside and outside diameters for fitting into the annular groove in the retainer means with a large gap between the leading and trailing edges of adjacent pads and with small clearances between the radial inner and outer ends of the pads and the walls of the retainer means. In general terms, the new method involves forming a ring as before but having the outside diameter of the ring substantially larger than the inside of the outer wall of the retainer means that contributes to defining the annular channel in the retainer means. In other words, originally the ring would not fit into the channel. The segments or bearing pads are individualized by sawing radially through the ring along circumferentially equally spaced apart radial lines. The kerf necessarily resulting from the sawing would leave a gap between pads which is greater than it must be for facilitating controlled leakage of the lubricating oil for low flow from the gaps in the pockets as required in the new bearing design. However, because of the original ring having an excessive outer diameter, the ring sector pads can be moved radially inwardly of the circle about which they are arrayed. This not only reduces the size of the gaps between leading and trailing edges of the pads but it also reduces the outside diameter of the arrays of pads so that the pads will fit into the annular channel of the retainer means. The larger ring also allows all of the pads to be made from one ring rather than two rings.

How the foregoing and other new features of the tilting pad low flow bearing assembly are achieved will now be set forth in the ensuing more detailed description of an illustrative embodiment of the invention in conjunction with the accompanying drawings.

DESCRIPTION OF THE DRAWINGS

FIG. 4 is a view of a thrust bearing assembly with some parts broken away and other parts shown in section to better exhibit the construction thereof, the tilt axis offset being 50%;

FIG. 5 is a side elevational view of the assembled thrust bearing depicted in FIG. 4;

FIG. 6 is a plan view of a circular array of sector shaped thrust bearing pads which have been generated by making radial cuts through pockets which have been milled in the ring preferably before the radial cuts are made;

FIG. 7 is a plan view of a low lubricant flow tilting pad thrust bearing assembly in accordance and with the invention wherein the tilting axes of the bearing pads are offset from the leading edges of the pads by as much as 70% of the distance between the leading and trailing edges of the pads;

FIG. 8 is a side elevational view of the bearing assembly of the preceding figure with parts broken away and parts shown in section taken on the, irregular line 8—8 in FIG. 7;

FIG. 9 is a partial plan view of the assembled thrust bearing of FIGS. 7 and 8 looking at the bearing surface of the thrust pads;

FIG. 10 is a section of the assembled thrust bearing, which uses 70% tilt axis offset, with parts broken away to exhibit underlying structure;

DESCRIPTION OF A PREFERRED EMBODIMENT

Figure 1:
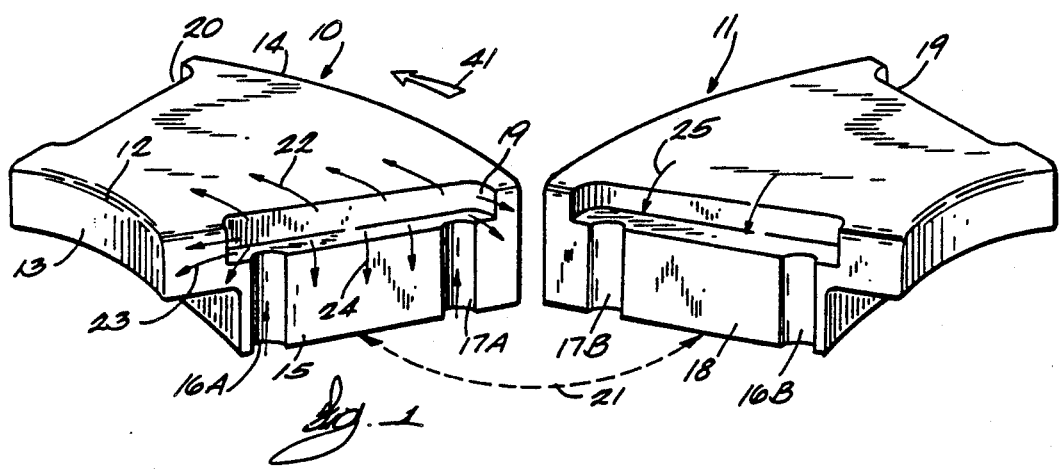
FIG. 1 is a perspective view of two bearing thrust pads which are spread open relative to each other to show how they are modified in accordance with the invention.

The manner in which the thrust bearing pads are modified in accordance with the invention can be easily visualized by referring to FIG. 1 where two adjacent identical thrust bearing pads are identified by the reference numerals 10 and 11. Pad 10, for example, is comprised of a metal body which is usually made of steel or a copper based alloy. A layer of a low friction material such as Babbitt metal 12 is deposited on the body and serves as the load bearing surface of the pad. The sector shaped pads are formed by making equally spaced apart radial cuts in a solid Babbitt coated ring as will be explained in greater detail later. Thus, the sectors have curved radially inner and outer end surfaces 13 and 14, respectively. Typical bearing pad 10 has an edge face 15 in which two axially extending lubricant and coolant conducting ducts 16A and 17A are formed. These ducts are substantially semicircular in cross section such that when the end face 18 of an adjacent bearing pad 11 is arranged contiguously to face 15 of bearing pad 10, semicircular ducts 16A and 16B combine to form a nearly circular duct and semicircular ducts 17A and 17B also combine to form a nearly circular axially extending duct. Each bearing pad 10 has a groove 19 formed in one edge and a corresponding groove 20 formed in the opposite edge. When the bearing pads are arranged with their edges next to each other as suggested by the dashed arrow headed line 21, the groove 19 from bearing pad !0 and the groove 20 from bearing pad 11 line up adjacent each other and form a pocket with a small gap between them. As will be elaborated later, typically the gap or space between edges 15 and 18 of adjacent pads will be from 0.003 to 0.020 of an inch. It will be observed that the radial extent of grooves 19 and 20 is less than the radial extent of the ends of the pads so that the pocket formed by arranging the grooves 19 and 20 next to each other is closed at the end except for the small gap which also exists at the ends. The arrows in semicircular ducts 16A and 17A are indicative of the direction in which lubricating oil is caused to flow toward the pocket and arrows 22, 23, 24 and are illustrative of the various directions in which oil can be relieved or flow out of the pocket during operation of this hydrodynamic bearing. The grooves 19 and 20 are of the same nominal circumferential depth preferably when the shaft and collar rotate in either direction. In bearings that are designed for journaling a collar on a shaft that rotates in one direction only, the mating grooves 19 or 20 that are at the leading edges of the pads join to form the pocket can have a greater depth in the circumferential direction so that a greater hydraulic force is developed by the fluid in the larger sized groove. Thus, when rotation of the shaft is initiated, the forces generated by the oil pressure in the larger groove will be such that bearing pad is tilted in the proper direction at a lower speed to cause formation of the wedge of lubricant which supports the load on the bearing pads. This phenomena, which is obtainable with the new bearing pad configuration, will be discussed later in reference to FIG. 13.

Figure 3:
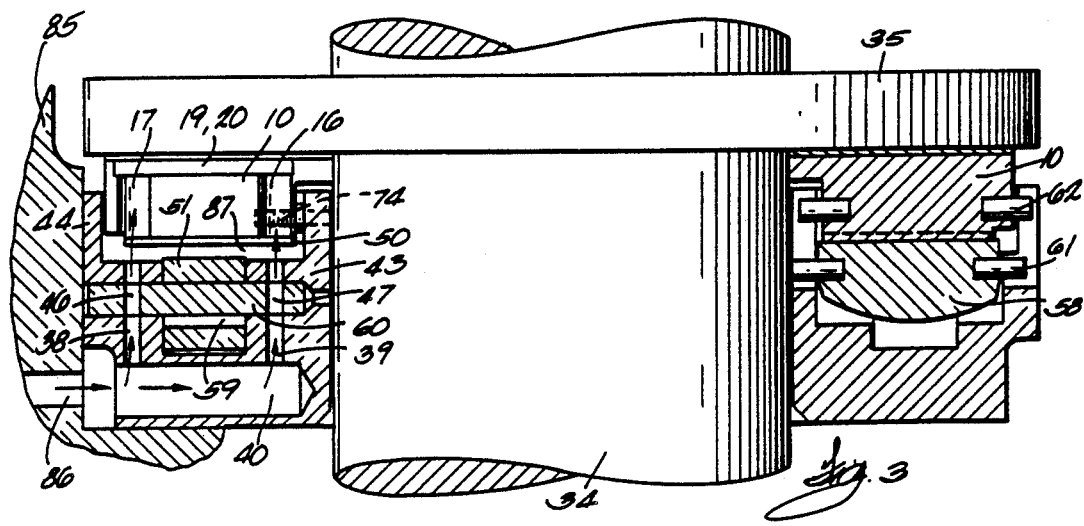
FIG. 3 is a cross section of the thrust bearing retainer, taken on line 3—3 in FIG. 4, with the bearing components installed and including a shaft and a collar which runs on the thrust bearing pads, in this embodiment the axes on which the bearing pads tilt are offset from the leading edges of the pads by 50% of the distance between the leading and trailing edges of the pads.
Figure 2:
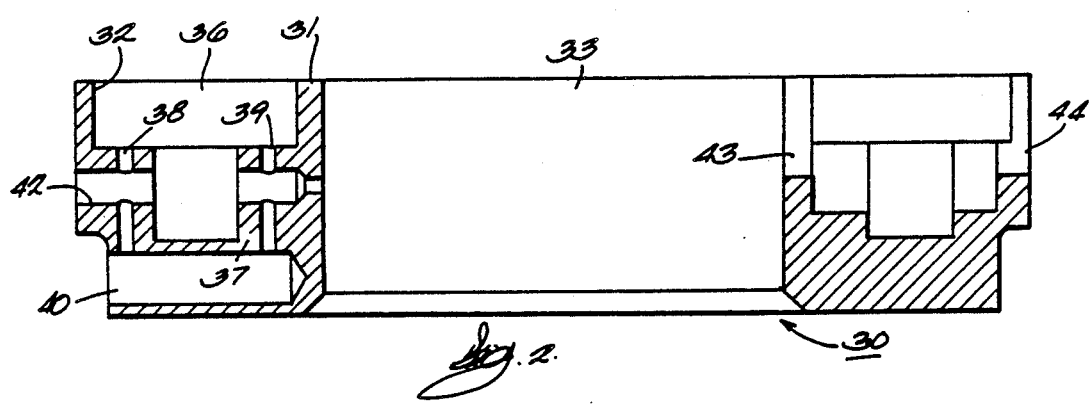
FIG. 2 is a diametral section of an annular thrust bearing retainer adapted for employing the low flow lubricant concept in accordance with the invention.

Refer to FIG. 2 for identification of the parts of the bearing retainer which is generally designated by the numeral 30 and is configured for a bearing wherein the pads tilt about axes that are offset 50% of the distance from the leading to the trailing edges of the pads. The retainer has inside and outside walls 31 and 32 which are concentric. The inside wall 31 surrounds a circular space 33 through which a shaft 34 extends when the bearing is assembled. The shaft is shown in FIG. 3. The shaft has a collar 35 fixed on it as is evident in FIG. 3. The collar is journaled on the Babbitt coated surfaces of the thrust bearing pads 10. The retainer in FIG. 2 has an annular channel 36 for accommodating the thrust pads 10 and the channel is configured for accommodating equalizing links and disks 51 and 58, respectively, when the bearing is assembled. There are periodically spaced apart radially extending webs 37 in the bearing retainer and there are radially extending holes 42 in the web for accommodating the pins 60 which are shown in FIG. 3. The webs have axially extending capillary holes such as those marked 38 and 39. Capillary holes 38 and 39 communicate with a radially extending hole 40 through holes 46 and 47 which extend diametrically through pins 45 on which equalizing links 57 are supported. There are as many of these radial holes 40 as there are joints between adjacent thrust pads. When the bearing is assembled as in FIG. 3, oil is forced into radial holes 40 and, as a result of pressure, is directed up through capillary tubes 38 and 39 in the retainer and as a result of kinetic energy the oil transfers to ducts 16 and 17 in the pads which are formed by semicircular ducts 16A and 16B being adjacent semicircular ducts 17A and 17B. The oil, after passing through the ducts in the ends of the pads, enters and fills the pockets. The flow paths of the oil and the manner in which the oil is divided as it emerges from the pockets will be discussed in greater detail later.

As shown in the right side of the retainer in FIG. 2 there are circumferentially spaced apart inside and outside axially extending slots 43 and 44 in the radially inside and outside walls 31 and 32 of the retainer. Their purpose will be evident in the next paragraph.

Figure 11:
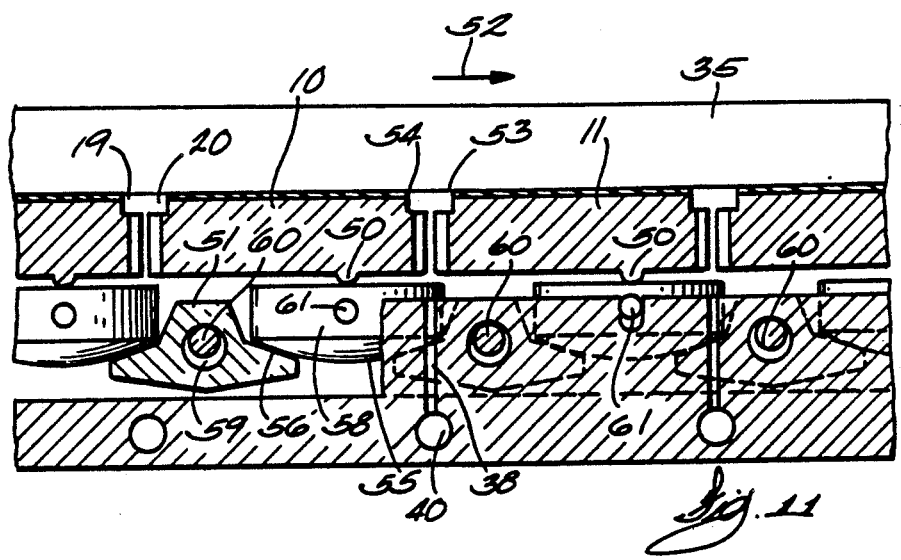
FIG. 11 is a sectional view taken on a line corresponding with 11—11 in FIG. 9.

FIG. 11 shows one manner in which the tilting thrust pads can be supported so that the load applied by way of the revolving collar 35 is distributed evenly among the thrust pads. In FIG. 11 the tilting axes of the pads, coincident with the radially extending ribs 50 on the pads, are offset by 70% of the distance from the leading edge to the trailing edge of the pads, but the manner in which the, pads are supported for load equalization among them by leveling links 51 and disks 58 is similar for the FIGS. 2-5 embodiment wherein the axes are offset by 50% of the distance. The load equalizing means depicted in FIG. 9 is described in greater detail in U.S. Pat. No. 4,403,873. Equalizing means such as is disclosed in U.S. Pat. No. 4,738,550 may also be used. There are other means which are well known in the art that can also be used. In FIG. 11 the bearing pads, such as identical pads 10 and 11, have a rib 50 extending along their bottom surfaces The rib is rounded at its lower end to establish essentially line contact with the top surfaces of leveling disks 58. The thrust pads tilt or pivot on the axis defined by the contact line between the planar top surface of leveling disks 58 and the line along which tangential contact is made with this surface by the rib. If the load collar 35 is rotating in the direction indicated by the arrow 52 in this 70% offset embodiment, edge 53 of the thrust pads is the leading edge and edge 54 is the trailing edge. With the direction of rotation assumed, under normal operation of the bearing assembly, the bearing pads will tilt by small amount counter-clockwise about the axis 50 so as to create the wedge shaped hydrodynamic oil film as is well known. Leveling disks 58 have spherical bottom surfaces 55.

The spherical surfaces 55 of leveling disks 58 bear on angulated wings 56 of two adjacent leveling links such as 51. The leveling links have radially extending through holes 59 and are supported for pivoting on pins 60. The periphery of each pin 60 makes tangential line contact with hole 59. As shown particularly well in FIG. 3, pins 60 are press fit in holes in the radially inward and outward walls 43 and 44 of the bearing retainer. Substantially equal fractions of the load transmitted by collar 35 are transmitted by pins 60 to the bearing retainer. As shown in FIG. 11 and other FIGS., leveling disks 58 have stub pins 61 extending radially from them. These pins hold leveling disks 58 in position against rotation about the retainer and do not carry any load. As can be seen in FIG. 3, for example, the thrust bearing pads 10 also have radially extending pins 62 which prevents the pads from being dragged along the bearing retainer by the frictional force that is applied to the bearing pads as a result of the frictional drag between the collar 35 and the babbitt coated surfaces of the bearing pads As mentioned earlier, the thrust pads 10 are produced by sawing into sectors a ring which has a Babbitt coating on its planar top surface. FIG. 6 shows the bearing pad sectors arranged in a circle before they are accurately fitted into the bearing retainer. The pins 62 which prevent the bearing pads from being carried around the retainer are installed already. Although all of the bearing pads are identical, successive ones are alternately identified by the reference numerals 10 and 11 to make it more convenient to discuss what is considered the trailing and leading edges and allows for identification of the grooves in the edges of the bearing pads. Thus, for the sake of consistency with FIG. 1, the groove which constitutes one half of the pocket at the end of pad 10 is marked 19 and the groove which constitutes the other half of the pocket on adjacent pad 11 is marked 20. The semicircular axially extending ducts 16A and 16B are juxtaposed to define what is presently a somewhat out of round duct 16. The same is true of mating semicircular ducts 17A and 17B. Preferably the grooves 19 and 20 may be milled in the end of the thrust pads before the parent ring is sawed into sectors. Single holes 16 and 17 are drilled through the ring and the saw cut is made diametrically of these holes so as to create the two semicircular mating ducts. The outside diameter of the parent bearing ring before being sawed would be too large to fit into the bearing retainer annular channel. In other words, in accordance with the invention, at least the outside diameter of the parent ring is larger than the outside diameter of the circle in which the bearing pad sectors are arranged in the bearing retainer. However, in accordance with the invention, a rotary saw having a thickness of about 0.060 of an inch is used to separate the ring into bearing pad sectors. Thus, there is a kerf of about the same thickness as the saw which means that there is initially a gap of about the same thickness between the ends of adjacent bearing pads. As shown in FIG. 6, due to the kerf, gaps such as the one marked 69 will exist. Note in FIG. 6 that the sector shaped bearing pads are not presently arranged in perfect circular alignment with each other to suggest that the pads can be moved radially inward so as to reduce the size of the gaps. In order to fit the thrust pads 10 and 11 into the annular channel defined between the walls 43 and 44 of the retainer as in FIG. 4, the thrust pads are moved radially inwardly so that their radially outward ends 14 of the pads will fit into the smaller diameter channel in the retainer. This results in the gaps 69 between ends of adjacent bearing pads being reduced. Typically, in accordance with the invention, the gap size, in a case where the kerf was about 0.060 of an inch, would be reduced to between 0.003 and 0.020 of an inch.

The invention features low lubricant volume, flow. There must be a proper proportionality between the amount of oil that is fed from the pocket into the wedge between collar and pad, the amount that is carried over from the trailing edge of one thrust pad to the leading edge of the adjacent thrust pad and the amount that is allowed to simply flow out of the gap between the ends of adjacent thrust pads in order to optimize the operating characteristics of the bearing. To have this kind of control over oil flow, means are provided for adjusting the thrust bearing pads radially inwardly and outwardly within the retainer for setting the gap size The adjustment means are most easily visualized in FIGS. 9 and 10 in a bearing assembly wherein the rib 50 for tilting is offset from the leading edge pocket groove 20 by 70% of the distance between the leading 20 and trailing edge pocket 19 when the collar, not shown, would be rotating counterclockwise. A typical adjusting means comprises an externally threaded screw 70 which is turned into a radially extended internally threaded hole 71 in the bearing pad 10. The screw has an integral head 72 and a hexagon socket, for example, in the head, which is accessible through a small hole 73 in the outer wall 44 of the bearing retainer. There is a similar screw 74 in a correspondingly threaded hole 75 on the inside edge of the thrust pad which screw 74 also has a head 76 in which there is a socket that is accessible by a hexagon wrench, for example, through a radial hole 77 in the inside wall 43 of the bearing retainer. There is a small gap 78 between the inside of the outer bearing retainer wall 44 and the radial outermost ends of the bearing pads and this clearance must be maintained in order for the thrust pads to tilt by a small amount during bearing operation without binding on the retainer. There ,is also a clearance gap 79 between the radially inward end of the pads and the inside wall 43 of the bearing retainer. Threads 70 and 74 can both be right hand threads, for example, or they could be both left hand threads or one of them could be a left hand thread and the other a right hand thread. Assuming they are both right hand threads and it is desired to set the gap 69 in the pockets comprised of grooves 19 and 20 in FIG. 7 to a minimum size of possibly 0.005 of an inch where the gaps are presently larger To reduce the gaps in the pockets, all bearing pads would have to be shifted radially inwardly In FIG. 7, this Would require rotating outer screw 70 in a direction that would tend to back it out of the threaded hole 71. This would cause head 72 to react against retainer wall 44 so as to bring about pushing the bearing pad radially inwardly. Concurrently or alternately, the other screw 74 would be turned into its hole in which case its head 76 is drawn away from retainer wall 43 sufficiently to let the pad move radially inwardly. When all the gaps are adjusted to specification, all of the outside screws 70 are given about one half of a turn in the direction needed to relieve the reactive force between the heads 72 and the retainer wall 44 to allow the bearing pads 10, 11 to tilt freely.

The flow paths of the oil for a bearing having 50% offset pivot axes for the pads will now be discussed in reference to FIG. 3. The FIG. 3 embodiment is one wherein the pivot points or pivot lines of the bearing pads 10 on the leveling disks 51 are centered or offset 50% of the distance between their radially extending opposite edges. In such, a case, the pins 60 on which the leveling links 51 are supported have diametral holes 46 and 47 through them. The bearing assembly is surrounded by a casing 85,, a part of which is shown in FIG. 3. Casing 85 has a port 86 which is subjected to oil pressure that is fed into the casing and into radially extending bore 40 formed near the bottom of the casing. Capillary tubes 38 and 39 intersect with bore 40 and holes 46 and 47 in pin 60. Pressurized oil is conducted by way of capillary tubes 38 and 39 to the space 87 where its kinetic energy causes it to flow into ducts 16 and 17 in the edges of the pads and into the pocket 19, 20.

Figure 12:
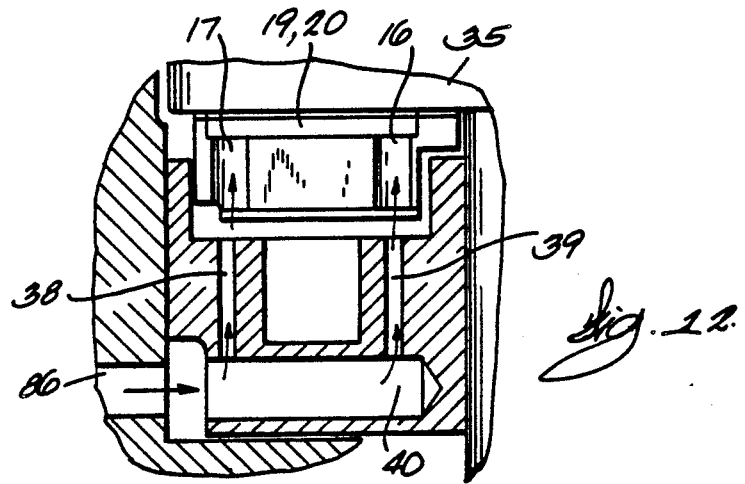
FIG. 12 is a radial elevational section taken on a line corresponding with 12—12 in FIG. 9.

The oil flow paths for a model of the bearing wherein the tilt axes of the thrust pads 10 are offset about 70% of the distance from the leading edge of the pad to the trailing edge will now be discussed in reference to FIGS. 7, 8, 11 and 12. In FIG. 12 embodiment the capillary tubes 38 and 39 re continuous, that is, because of an angle between the leveling link support pins 60 and the pad ends 15 or 18 which are shown in FIG. 1 it is not necessary to have the capillary tubes pass through the leveling link pins 60. FIGS. 7 and 8 illustrate the absence of diametral holes in leveling link support pins 60. In FIG. 12 one may see that the oil agains enters the radial bores 40 in the casing through port 86 and the oil is forced up capillary tubes 38 and 39 from which it crosses a gap by virtue of its kinetic energy so as to flow into ducts 16 and 17 then into the pocket 19, 20.

From the description thus far, it will be evident that the capillary tubes 38, 39 and ducts 16, 17 provide the only path for oil to be delivered to the pockets. Oil can only escape from the pockets through the gaps between adjacent bearing pads but a determined amount of oil can be carried over the pockets from the trailing edges of adjacent thrust pads. The various flow paths into and out of the pockets have been previously mentioned in connection with FIG. 1 and have been indicated by arrows 22, 23, 24 and 25. How the discharge from the pockets is divided depends upon the size of the gap between adjacent bearing pads. Referring to FIG. 11, for the sake of example, the collar 35 is assumed to be turning in the direction of the arrow 52 which provides for identifying a trailing edge 54 on a pad marked 10, for example, and a leading edge 53 on a pad marked 11. As is known, there is the wedge of lubricating oil formed between the collar 35 and the Babbitt top surface of the pads. The larger gap between pocket edges means that lower temperature oil will be delivered to the opening at the leading edge so the pads will operate at a lower temperature. In other words, if there is a lot of leakage from the pocket because of a large gap, the inlet temperature to the pad drops. If more oil is fed into the pocket and mixed with the trailing edge oil, lower temperature oil will be fed to the leading edge. Thus, by adjusting the size of the gaps it is possible to adjust the leakage and to thereby control the temperature of the oil entering the wedge. Regardless of the gap adjustment, because the pocket holds the oil at the front edge of the pad until it is needed by the hydrodynamic wedge, less oil feed is needed and that explains why the bearing is characterized as a low flow bearing. Thus, the gap can be adjusted for low oil flow, low oil inlet temperature or a compromise of the two.

The equation for determining the gap adjustment is given below and an example of the calculation for a 10½ inch diameter bearing is given thereafter.

$$T_{PAD} = \frac{Q_{DUCT}T_{DUCT} + Q_{PADOUT}T_{PADOUT}}{Q_{PADIN} + Q_{GAP}}$$

where:

$T_{PAD}$=Pad inlet oil temperature, F°.
$Q_{PADIN}$=Pad inlet flow (GPM).
$Q_{GAP}$=Gap exit flow (GPM).
$Q_{DUCT}$=Total duct supply flow (GPM).
$T_{DUCT}$=Supply duct oil temperature, F°.
$Q_{PADOUT}$=Flow from previous pad (GPM).
$T_{PADOUT}$=Temperature of oil flowing from preceding pad F°.
GPM=Gallons per minute.

Typical flow and temperature data for a 10½ inch thrust bearing supporting a 27,500 pound load at 8000 rpm show a reduction in speed inlet oil temperature of 5.3F° when the gap is increased from 0.010 inch to 0.015 inch. The pad inlet hydrodynamic flow is 5.05 gallons per minute (gpm). The trailing edge of the preceding pad supplies 2.18 gpm to the pocket at 193F°. The gap flow at 15 psi pocket pressure is 1.66 gpm. A flow balance may be used to determine the duct flow, 4.53 gpm which is at 120F°. The energy balance yields a pad inlet temperature ($T_{PAD}$) of:

$$T_{PAD} = \frac{(4.53)(120) + (2.18)(193)}{5.05 + 1.66}$$

$$T_{PAD} = 143.7° F.$$

The same procedure, at a gap of 0.010 inch yields pad inlet temperature of 149F°; thus, a 5.3F° reduction in pad inlet temperature occurs.

The pockets aid in developing the hydrodynamic lubricant wedge at start up at a lower shaft speed than it takes to establish the wedge in prior art bearings. In reference to FIG. 11, for example, it is shown that by creating pressure in the pocket 20 at the leading edge 53 of a thrust pad it will tilt the leading edge 20 of the pad away from collar 35, (counterclockwise about tilt axis 50 in FIG. 11) to initiate hydrodynamic lubrication earlier in the run up to initiation of hydrodynamic lubrication speed. This will be explained in reference to the FIG. 13 diagram of a pad 10 as seen when looking at its outer end.

Figure 13:
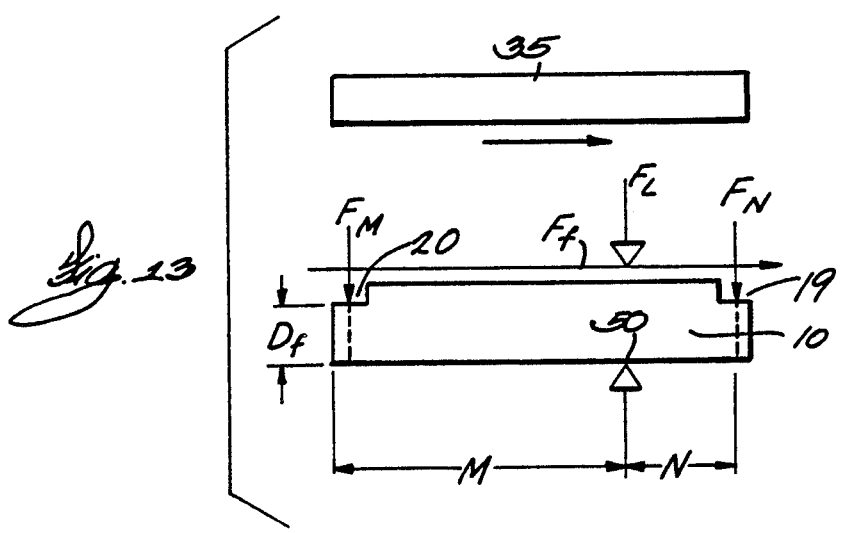
FIG. 13 is a diagram which is useful for explaining how the new thrust bearing pad configuration induces development of a hydrodynamic lubricant wedge at lower rotational speed of the shaft collar.

In FIG. 13:

$F_L$=Load force.
$F_f$=Friction force.
$D_L$=Load moment arm relative to tilt axis 50.
$D_f$=Friction moment arm relative to tilt axis 50.
A=Pocket (POC) area.
$P_{POC}$=Pocket pressure.
$F_f=\alpha$ (constant)$\times F_L$.
$\alpha$=0.06 (average).
$\alpha_1$=0.08–0.14 boundary lubrication.
$\alpha_2$=0.02–0.08 mixed lubrication.
$M_{PIVOT}\approx 0$
$M_{pivot}=F_fD_f-F_MM+F_NM$
$=0.6F_LD_f-F_MM+F_NN$ If pockets are the same size ($F_M=F_N$) then load to balance for friction is:

$$F_M = F_N = \frac{.06F_L D_f}{(M - N)}$$

The equation to size the pocket for offset pivot axis pads is:

$$A_M = A_N = \frac{0.12 F_L D_f}{P_{POC}(M - N)}$$

If pocket halves are of different areas and there is a center pivot axis (50% offset), then the area difference is:

$$A_M - A_N = \frac{.12 F_L D_f}{P_{POC} M}$$

As the shaft accelerates from rest to hydrodynamic speed, the friction coefficient, $\alpha$, is decreasing, thus providing speed hydrodynamic lift off alternatives when setting the pocket pressure and area.

Figure 14:
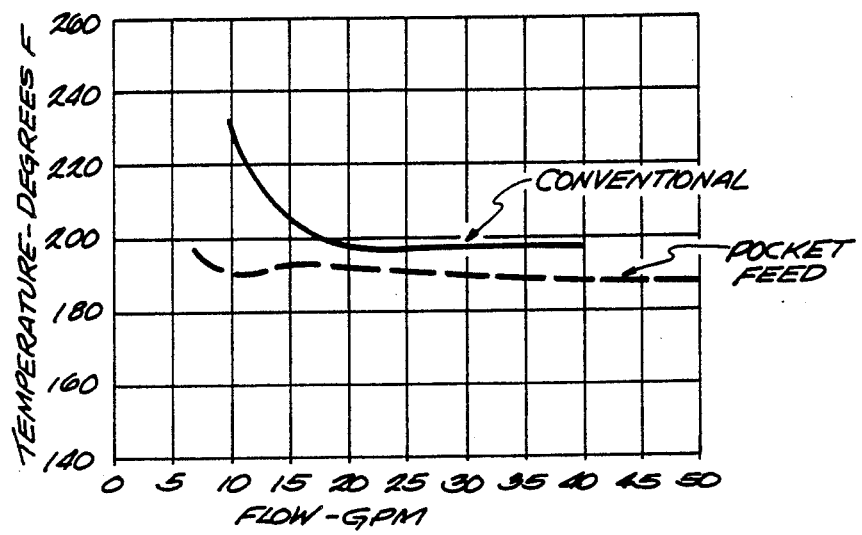
FIG. 14 is a graph of bearing pad local temperature versus lubricant flow rate for the new pocket feed tilting pad thrust bearing and for conventional tilting pad thrust bearings.

FIG. 14 is a graph of oil flow in gallons per minute versus bearing pad temperature in degrees F for a conventional tilting pad thrust bearing and a bearing having oil fed into pockets in the pads according to the invention. The temperatures are the average of temperatures taken at various points in the pads under load test conditions. It is standard practice in testing setups to have holes drilled from the back side of the thrust pads for accommodating a thermocouple, not shown, in each of them. These temperatures under running conditions are averaged and plotted against flow rate. One may see in FIG. 14 that for the comparable conventional bearing at low flow such as at about 10 gallons per minute (GPM) the pad temperature is about 230°. The temperature did not drop down to an acceptable 200° until about 18 GPM was pumped through the bearing housing. The bearing pads were conventional in the respect that they had no pockets, had the traditionally large gap between them and the whole bearing structure was bathed in oil rather than being fed in a predetermined path such as is accomplished with the capillary tubes, ducts and pockets in the new pocket feed thrust pads. The temperature versus flow plot for the pocket feed bearing is represented by a dashed line. Observe that stable temperature conditions were reached at a low lubricant flow rate of about 6 GPM. Thus, it will be evident that the design permits operating at minimum thrust pad temperature at a time when the flow rate is relatively low. It would be evident, therefore, that the pocket feed bearing can use a lubricant pump that has lower capacity than a pump that would have to be used for a correspondingly sized conventional bearing under identical load and rotational speed conditions. This means that the heat exchangers, not shown, the piping and the pump motor size can all be reduced for the pocket feed bearing as compared to the corresponding conventional bearing. Thus, a significant cost reduction is obtained by using the pocket feed bearing.

Figure 15:
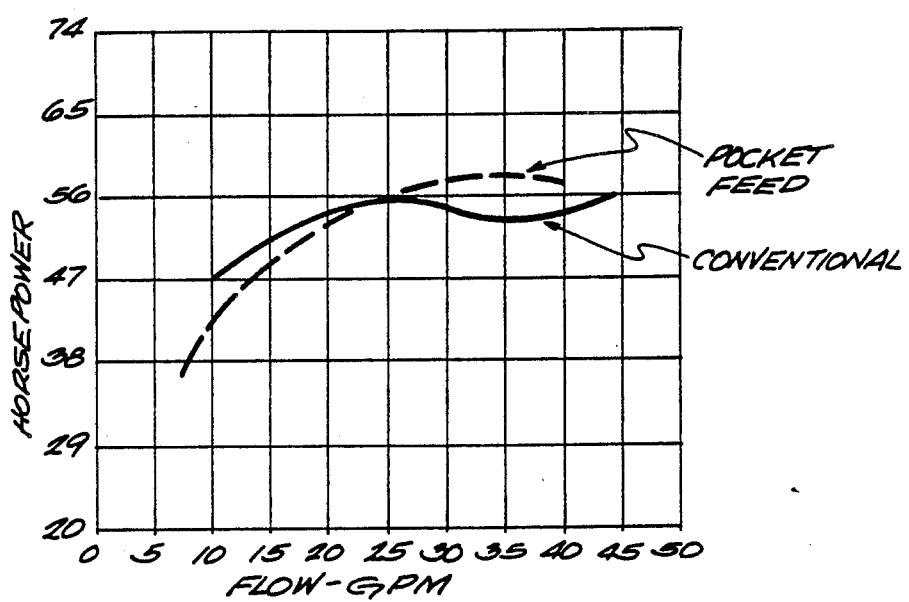
FIG. 15 is a graph of horsepower dissipated in the bearing versus lubricant flow rate for the new pocket feed tilting pad thrust bearings and conventional tilting pad thrust bearings.

FIG. 15 is a graph of horsepower dissipated or used in the bearing versus flow rate of the lubricant for a pocket feed bearing and for a conventional bearing. Note that at the low flow rate of 10 GPM the pocket feed bearing dissipates about 5 horsepower less than the conventional bearing.

The bearing load rating can be increased by making the pocket somewhat smaller. The individual pad surface areas which support the load are increased which increases bearing capacity.

Parasitic power losses are reduced with the pocket feed concept by minimizing through-flow losses and surface frictional drag losses. Through-flow losses occur in the passages to and from the actual load carrying pad surfaces. Surface frictional drag losses result from shearing the oil when the oil contacts a rotational surface such as the shaft or collar on the shaft.

I claim:

1. A method of making a tilting pad thrust bearing including the steps of:

forming a metal ring containing a central axially extending hole having an inside diameter, one face of the ring constituting a load bearing surface and the ring having an outside diameter which is larger than the largest diameter inside of an annular channel in which the ring, after being cut into segments is intended to fit, milling in said load bearing surface along radii a plurality of equiangularly spaced apart grooves extending over a majority of the radial distance between said inside and outside diameters but with the radially spaced apart ends of the respective grooves remaining closed, drilling at least one axially directed hole in the respective grooves completely through the ring, dividing said ring by cutting through said ring along radially lines coincident with radii of the ring which pass through the center of said holes and extend centrally of said grooves, respectively, thereby producing a plurality of segments constituting bearing pads, whereby removing metal as a result of said cutting provides gaps between pads allowing the pads to be moved radially inwardly for reducing the outside diameter of the circularly arranged pads so the pads can fit into said annular channel, installing the reduced circularly arranged pads into said annular channel of said retainer and then adjusting the pads radially relative to the axis of said annular channel in the retainer until a predetermined clearance is established between the pads and the wall of the annular channel and a small leakage bag of desired size is established between the radially edges of adjacent pads.

2. A method of making a titling pad thrust bearing including the steps of:

forming a metal ring containing a central axially extending hole having an inside diameter, one face of the ring constituting a load bearing surface and the ring having an outside diameter which is larger than the largest diameter inside of an annular channel in which the ring, after being cut into segments i intended to fit, drilling at least one axially directed hole on equiangularly spaced apart radii of said ring completely through said ring, dividing said ring by cutting through said ring along radii on which said holes line, thereby producing a plurality of segments constituting bearing pads having interfacing radially extending edges wherein said holes are divided into substantially semicircular in cross section axially extending interfacing grooves constituting axially extending ducts, milling in said load bearing surface of each bearing pad adjacent each of the pads a groove extending over a majority of the radially distance between said inside and outside diameters of the ring but with the radially spaced apart ends of the grooves remaining closed and with the sides of the grooves coincident with said edges of the pads being open such that interfacing grooves on adjacent pads form a pocket for being supplied with a liquid lubricant through said axially extending ducts, said cutting removing metal between bearing pads to provide gaps between the edges of the pads allowing the pads to be moved radially inwardly for reducing the outside diameter of the circularly arranged pads so the pads can fit into said annular channel, installing the reducing circularly arranged pads into said annular channel of said retainer and then adjusting the pads radially relative to the axis of said annular channel in the retainer until a predetermined clearance is established between the pads and a small leakage gap of desired size is established between the radially extending edges of adjacent pads.

3. A method of making a tilting pad thrust bearing including the steps of:

forming a metal ring containing a central axially extending hole having an inside diameter, one face of the ring constituting a load bearing surface and the ring having an outside diameter which is larger than the largest diameter inside of an annular channel in which the ring, after being cut into segments is intended to fit, milling in said load bearing surface along radii a plurality of equiangularly spaced apart grooves extending over a majority of the radial distance between said inside and outside diameters but with the radially spaced apart ends of the respective grooves remaining closed, dividing said ring by cutting completely through the ring along radii coincident with the centers of the respective grooves, thereby producing a plurality of segments constituting bearing pads each of which has edges interfaced with adjacent edges which contain half of a groove, whereby removing metal as a result of said cutting provides gaps between pads allowing the pads to be moved radially inwardly for reducing the outside diameter of the circularly arranged pads so the pads can fit into said annular channel, milling in said edges, respectively, at least one axially extending generally semicircular groove at radially equal distances from the center of the ring such that with the edges of the bearing pads interfaced said semicircular grooves in one edge is adjacent the groove on an interfacing edge to form a generally circular duct for admitting liquid lubricant to pockets formed by interfacing of the halves of the grooves which resulted from cutting through the grooves which were milled in the load bearing surface of the ring, installing the circular arranged pads into the annular channel of the retainer and then adjusting the pads relative to said annular channel in the retainer until a predetermined clearance is established between the pads and the wall of the annular channel and a small leakage gap of desired size is established between the radially extending edges of adjacent pads.

* * * * *

UNITED STATES PATENT AND TRADEMARK OFFICE
CERTIFICATE OF CORRECTION

PATENT NO. : 5,068,965

DATED : December 3, 1991

INVENTOR(S) : James H. Ball and Willis W. Gardner

It is certified that error appears in the above—identified patent and that said Letters Patent is hereby corrected as shown below:

Column 12, line 32:
   Before "thereby" insert --- to ---.
   Delete "producing" and substitute --- produce ---.
Column 12, line 45:
   Delete "bag" and substitute --- gap ---.
Column 12, line 46:
   After "radially" insert --- extending ---.
Column 12, line 55:
   Before "intended" delete "i" and substitute --- is ---.
Column 12, line 60:
   Delete "line," and substitute --- lie to ---.
   Delete "producing" and substitute --- produce ---.
Column 13, line 1:
   Delete "radially" and substitute --- radial ---.
Column 13, line 15:
   Delete "reducing" and substitute --- reduced ---.
Column 14, line 6:
   After "grooves"delete the "," (comma) and insert --- to ---.
   Delete "producing" and substitute --- produce ---.

Signed and Sealed this

Sixth Day of April, 1993

*Attest:*

STEPHEN G. KUNIN

*Attesting Officer*         Acting Commissioner of Patents and Trademarks